Nov. 24, 1942.    G. W. CRISE    2,302,742
BALL BEARING
Filed April 18, 1939
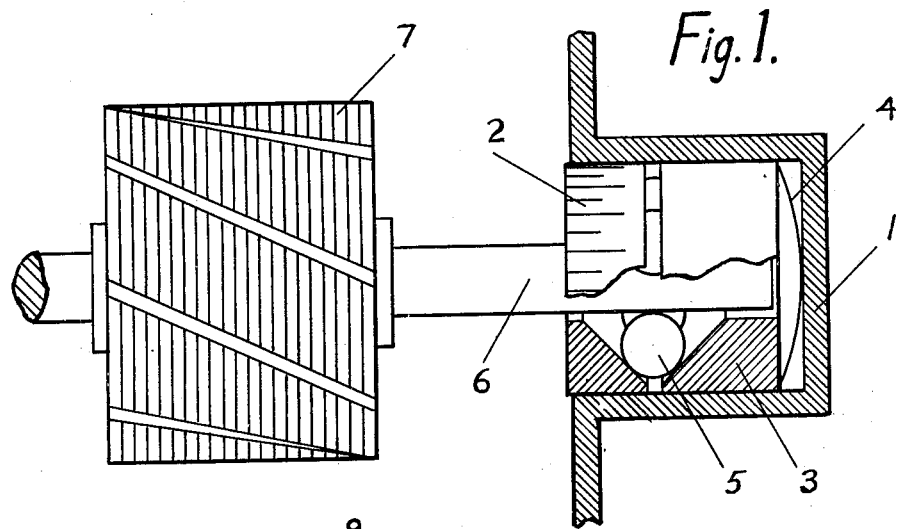
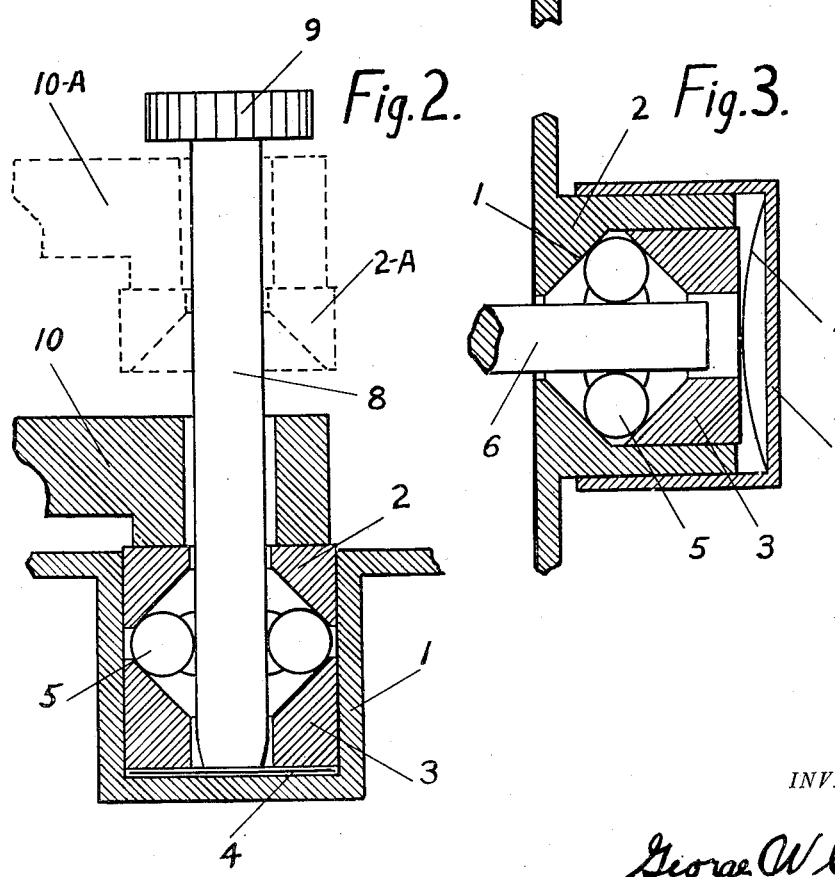
INVENTOR.
George W Crise Patented Nov. 24, 1942

2,302,742

UNITED STATES PATENT OFFICE 2,302,742

BALL BEARING

George W. Crise, Mount Vernon, Ohio

Application April 18, 1939, Serial No. 268,557

2 Claims. (Cl. 308—197)

This invention relates to ball bearings and particularly to a bearing having a divided outer race, in which one side of the outer race is rigidly mounted in the bearing housing and the other side accurately fit to the bearing housing but free to slide endwise under spring pressure to take up play, together with a suitable method of making, fitting and mounting same.

An object of the invention is to produce a small and inexpensive self aligning ball bearing which in normal operation is permanently free from play and chatter. Other objects of the invention will appear from the disclosure herein.

An important use of such a bearing is in connection with small alternating current motors, where owing to the light weight of the parts there is a decided tendency of the armature to virbrate because of the alternating magnetic field, resulting also in objectionable noise and wear. This is particularly true of motors used in electric clocks, and certain types of damper and valve operators where the current of the motor is continuously energized and the motor stands normally in a stalled position.

The details of my invention are illustrated by the preferred forms in the accompanying drawing, in which—

Figure 1 is a view partly in elevation and partly in section of one form of my bearing as used in a small motor: Fig. 2, a sectional view of the same bearing showing the method of installation: Fig. 3, is a modification of the construction shown in Fig. 1 but employing part of the housing as the stationary part of the bearing race.

Like characters of reference on the views designate corresponding parts throughout the several views.

Referring to the views collectively, the character 1 designates a bearing housing that may be a part of the motor frame. 2 is a stationary section of the outer ball race rigidly mounted in the bearing housing. 3 designates a movable section of the outer race which is continuously pressed toward the stationary race portion 2 under the influence of a normally curved round wafer or plate type spring 4 or any other form of suitable spring. The said spring 4 is diametrically flexible. 5 is a series of steel balls contacting with the shaft 6, said shaft serving as the inner race.

Referring now more particularly to Fig. 1, the character 7 designates a motor armature mounted on shaft 6 engaged with the automatically tightening bearing combination.

Referring to Fig. 2, the rotatable spindle 8 having a manipulative knob 9, cooperating with the movable presser-foot 10 to form a race setting jig for assembling the bearing. The method of assembly is as follows:

Assuming that the cup-like chamber of the bearing housing 1 is accurately reamed, a curved wafer spring 4 is dropped into the bottom or closed end of the housing and on which spring the movable race section 3 is then superposed. With the presser foot 10 elevated as shown in broken lines at 10a a knurled and slightly oversized race section 2 is strung on spindle 8 as shown in broken lines at 2—A. The spindle 8 is then dropped through the race section 3 onto the spring 4, and the necessary number of the balls 5 are poured into the bearing housing around the spindle and by rotating the spindle 8 by means of knob 9, they are arranged in a circle about the spindle 8 as indicated in Fig. 2.

The presser foot 10 and the bearing race section 2 are then lowered to the position as shown in full lines in Fig. 2 and by gradually pressing the tight fitting race section 2 into the bearing housing at the same time the balls 5 are driven downward. When the free race portion 3 has reached its limit of travel downward under the pressure of balls 5, due to the flattening of spring 4 against the bottom of the bearing housing 1 the balls 5 will so bind against the spindle 8 that by rotating the spindle the proper condition of bearing adjustment will be indicated by the harder turning of knob 9.

By making the spindle 8 a few thousandths of an inch larger than the normal shaft 6 the bearing adjustment just described will permit said shaft 6 to rotate freely and at the same time allow for maximum spring action to take up play and wear.

Referring to Fig. 3, a bearing cap 11 is employed to complete the bearing assembly thus providing an adjustable press fit cover or housing which may be adjusted endwise to regulate the pressure of the spring 4 against the movable race 3.

An important feature of the bearing construction is the ratio of the shaft size to the size and number of balls used, so as to prevent the possibility of the balls falling out when the shaft is removed.

It will be obvious that when the shaft is removed the two bearing race sections drive the balls toward the center of the race while at the same time maintaining them in a perfect circle.

By selecting for example six $\frac{1}{16}$ inch balls to operate around a shaft slightly over 1/16 inch in diameter, a small spacing is maintained between the balls for free turning; and when the shaft is removed the circle of balls will contract uniformly until they form a tight circular ring having an inside diameter of approximately 1/16 inch into which the shaft can be reinserted at will. Any combination of balls and shafting so selected that when the shaft is removed the balls will contract into a tight ring having an inside diameter slightly smaller than that of the shaft, will permit the free removal and replacement of the shaft on a bearing having a split outer race of the type described when one of the race sections is free to move under spring pressure. In the bearing construction illustrated in the drawing it will be seen that each of the complemental race sections 2 and 3 has a recess therein providing a concave substantially frusto-conical face and that when the race sections are arranged in substantially coaxial relation in the bearing chamber such frusto-conical faces are in adjacent base-to-base relation and define an annular race-way in which the ring of uncaged balls 5 operate. Under the influence of the spring 4 the frusto-conical face of the movable race section 3 exerts a wedging action or compressive force on the balls thereby taking up looseness and urging the balls into a tight ring, as explained above, when the shaft or inner race is withdrawn.

The forms of the parts can be changed without departing from the gist of the invention as claimed.

What I claim is:

1. A bearing of the character described comprising a housing closed at one end and providing a cup-like bearing chamber, an outer race engaging in said chamber and having a shaft-receiving opening, a shaft or inner race adapted to be axially inserted into or removed from the opening of said outer race, said outer race being formed by two complemental race sections each having a recess therein providing a concave substantially frusto-conical face, said sections being arranged in substantially coaxial alignment in said bearing chamber with their concave frusto-conical faces in adjacent base-to-base relation forming an annular race-way with which said shaft-receiving opening communicates, the race section which is the more remote from the closed end of the housing being stationary in the housing and the other race section being shiftable axially relative to the stationary section, a ring of uncaged balls operable in said race-way and supporting said shaft or inner race, and a plate type spring between said closed end of the housing and said shiftable race section and urging the latter toward the stationary section so as to exert a compressive force on the balls.

2. A bearing of the character described comprising a housing closed at one end and providing a cup-like bearing chamber, an outer race engaging in said chamber and having a shaft-receiving opening, a shaft or inner race adapted to be axially inserted into or removed from the opening of said outer race, said outer race being formed by two complemental race sections each having a recess therein providing a concave substantially frusto-conical face, said sections being arranged in substantially coaxial alignment in said bearing chamber with their concave frusto-conical faces in adjacent base-to-base relation forming an annular race-way with which said shaft-receiving opening communicates, the race section which is the more remote from the closed end of the housing being stationary in the housing and having a sleeve portion extending toward said closed end and the other race section being shiftable axially in said sleeve portion, a ring of uncaged balls operable in said race-way and supporting said shaft or inner race, and a plate type spring between said closed end of the housing and said shiftable race section and urging the latter toward the stationary section so as to exert a compressive force on the balls.

GEORGE W. CRISE.